United States Patent
Peters et al.

(10) Patent No.: US 9,217,397 B2
(45) Date of Patent: Dec. 22, 2015

(54) FUEL TANK PRESSURE SENSOR RATIONALITY TEST FOR A PHEV

(71) Applicant: FORD GLOBAL TECHNOLOGIES, LLC, Dearborn, MI (US)

(72) Inventors: Mark W Peters, Wolverine Lake, MI (US); Robert Roy Jentz, Westland, MI (US); Aed M Dudar, Canton, MI (US); Roman Schesnuk, Chesterfield, MI (US); Jack Marshall, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 274 days.

(21) Appl. No.: 14/027,404

(22) Filed: Sep. 16, 2013

(65) Prior Publication Data
US 2015/0075501 A1    Mar. 19, 2015

(51) Int. Cl.
  *F02M 33/02*    (2006.01)
  *F02M 25/08*    (2006.01)

(52) U.S. Cl.
  CPC ................ *F02M 25/0854* (2013.01)

(58) Field of Classification Search
  CPC .......... F02M 25/0836; F02M 25/0854; F02D 2041/224
  USPC ................. 123/516, 518, 520; 701/103, 107; 73/114.38, 114.49
  See application file for complete search history.

(56) References Cited

U.S. PATENT DOCUMENTS

| | | | |
|---|---|---|---|
| 2011/0079201 A1* | 4/2011 | Peters et al. ................. | 123/520 |
| 2014/0257668 A1* | 9/2014 | Jentz et al. ................... | 701/102 |
| 2014/0336873 A1* | 11/2014 | Dudar et al. ................. | 701/33.9 |
| 2015/0020779 A1* | 1/2015 | Peters et al. ................. | 123/518 |
| 2015/0083087 A1* | 3/2015 | Pearce et al. ................. | 123/520 |
| 2015/0122228 A1* | 5/2015 | Bolger et al. ................ | 123/518 |
| 2015/0122229 A1* | 5/2015 | Dudar et al. ................. | 123/518 |
| 2015/0198103 A1* | 7/2015 | Dudar et al. ........ | F02D 41/0032 |
| 2015/0198123 A1* | 7/2015 | Pearce et al. ....... | F02M 25/0854 |

* cited by examiner

*Primary Examiner* — Hai Huynh
(74) *Attorney, Agent, or Firm* — Joseph E. Root

(57) ABSTRACT

A method for verifying the reliable operation of a fuel tank pressure transducer positioned within a fuel tank of a PHEV. The method detects the initiation of a refueling cycle, which leads to opening a system vent valve positioned between a carbon canister and a system vent, and opening a fuel tank isolation valve. A controller monitors fuel system pressure within the fuel tank and at the vent valve, and that device determines rates of change of the fuel system pressure within the fuel tank and at the outlet vent. Reliable operation of the fuel tank pressure transducer is indicated upon a determination that the rates of change of the fuel system pressure in the fuel tank and at the outlet vent are uniform within a predetermined range.

7 Claims, 6 Drawing Sheets

FUEL TANK PRESSURE SENSOR RATIONALITY TEST FOR A PHEV

TECHNICAL FIELD

Embodiments of the present disclosure generally relate to Evaporative Emission Control Systems (EVAP) for automotive vehicles, and, more specifically, to pressure sensors disposed within the fuel tanks of Plug-in Hybrid Electric Vehicles (PHEVs) incorporating EVAP systems.

BACKGROUND

Automotive fuel, primarily gasoline, is a volatile liquid subject to potentially rapid evaporation, in response to diurnal variations in the ambient temperature. Thus, the fuel contained in automobile gas tanks presents a major source of potential evaporative emission of hydrocarbons into the atmosphere. Such emissions from a vehicle constitute what is technically called as 'evaporative emissions'. Even if the vehicle's engine is turned off, these fuel vapors are produced.

Industry's response to this potential problem has been the incorporation of the evaporative emission control systems (EVAP) into automobiles, to prevent fuel vapor from being discharged into the atmosphere. The EVAP systems include a canister containing adsorbent carbon (i.e., carbon canister) that traps those fuel vapors and feeds them back to the intake manifold of the engine of the vehicle for combustion, thus, reducing evaporative emissions from the vehicle.

Hybrid electric vehicles, including plug-in hybrid electric vehicles (HEV's or PHEV's), pose a particular problem for effectively controlling evaporative emissions with this kind of system. Although hybrid vehicles have been proposed and introduced having a number of forms, these designs share the characteristic of providing a combustion engine as backup to an electric motor. Primary power is provided by the electric motor, and careful attention to charging cycles can result in an operating profile in which the engine is only run for short periods. Systems in which the engine is only operated once or twice every few weeks are not uncommon. Purging the carbon canister can only occur when the engine is running, of course, and if the canister is not purged, the carbon pellets can become saturated, after which hydrocarbons will escape to the atmosphere, causing pollution.

Further, PHEVs have a sealed fuel tank designed to withstand differences in pressure and vacuum within the tank resulting from diurnal ambient temperature variations. A Fuel tank pressure transducer (FTPT), being a high pressure sensor, is generally disposed within the tank, to measure the pressure within the interior of the tank. Performing a rationality test to ensure effective operation of the FTPT is difficult in PHEVs, as the tank cannot be easily vented. In any event, venting would not be desirable, as that action could cause hydrocarbons to be eventually emitted to the atmosphere, causing pollution.

Considering the problems mentioned above, and other shortcomings in the art, there exists a need for a more effective and efficient system and method for ensuring reliable operations of the fuel tank pressure transducer positioned within the fuel tank of a vehicle.

SUMMARY

The present disclosure provides a system and a method for ensuring reliable operation of a fuel tank pressure transducer (FTPT) positioned within the fuel tank of a plug-in hybrid electric vehicle.

An aspect of the present disclosure is a method for verifying the reliable operation of a fuel tank pressure transducer positioned within a fuel tank of a PHEV. The method begins by detecting the initiation of a refueling cycle, which leads to opening a system vent valve positioned between a carbon canister and a system vent, and opening a fuel tank isolation valve to depressurize the fuel system. A controller monitors fuel system pressure within the fuel tank and at the vent valve, and that device determines rates of change of the fuel system pressure within the fuel tank and at the outlet vent. Reliable operation of the fuel tank pressure transducer is indicated upon a determination that fuel system pressure at the outlet vent rises to the level of fuel system pressure indicated in the fuel tank, and that the rates of change of the fuel system pressure in the fuel tank and at the outlet vent are uniform within a predetermined range.

Additional aspects, advantages, features and objects of the present disclosure would be made apparent from the drawings and the detailed description of the illustrative embodiments construed in conjunction with the appended claims that follow.

DETAILED DESCRIPTION OF ILLUSTRATIVE EMBODIMENTS

The following detailed description illustrates aspects of the disclosure and its implementation. This description should not be understood as defining or limiting the scope of the present disclosure, however, such definition or limitation being solely contained in the claims appended to the specification. Although the best mode of carrying out the invention has been disclosed, those in the art would recognize that other embodiments for carrying out or practicing the invention are also possible.

Environmental regulators are steadily tightening the standards for vehicle vapor emissions. Environmental authorities in certain regions, such as California, typically require less than about 500 mg of hydrocarbons released as vehicle evaporative emissions in a standard 3 day test. Given other sources of emissions, the standard effectively limits canister emissions to less than about 200 mg. Euro 5/6 regulations enforce a limit of about 2 grams of evaporative emissions per day. Such stringent conditions demand a highly efficient and effective evaporative emission control system, which in turn should by leakage free.

The On-Board Diagnostic regulations mandate that the EVAP system should be regularly checked for leakage. Many conventional EVAP leakage detection monitors use an Evaporative Leakage Check Module (ELCM) pump to evacuate the canister side of the system each time the monitor runs. If the fuel tank still holds pressure or vacuum, then one can infer that no leak exists, and the evacuation of the fuel tank is not initiated at all. Also, a fuel tank pressure transducer (FTPT) is placed within the fuel tank of the vehicle to measure fuel vapor pressure there.

A problem could exist, however, where the FTPT fails within range. Then, the ELCM would not evacuate the fuel tank side of the system during leakage check, raising the probability that a leaky fuel tank could go undetected. Further, PHEV's have sealed fuel tanks, and opening a tank where he vacuum exists would likely result in hydrocarbon vapors being emitted. Therefore, performing a rationality test to ensure reliable operation of the FTPT could alleviate that problem by increasing increase the EVAP leakage detection system reliability.

Figure 1:
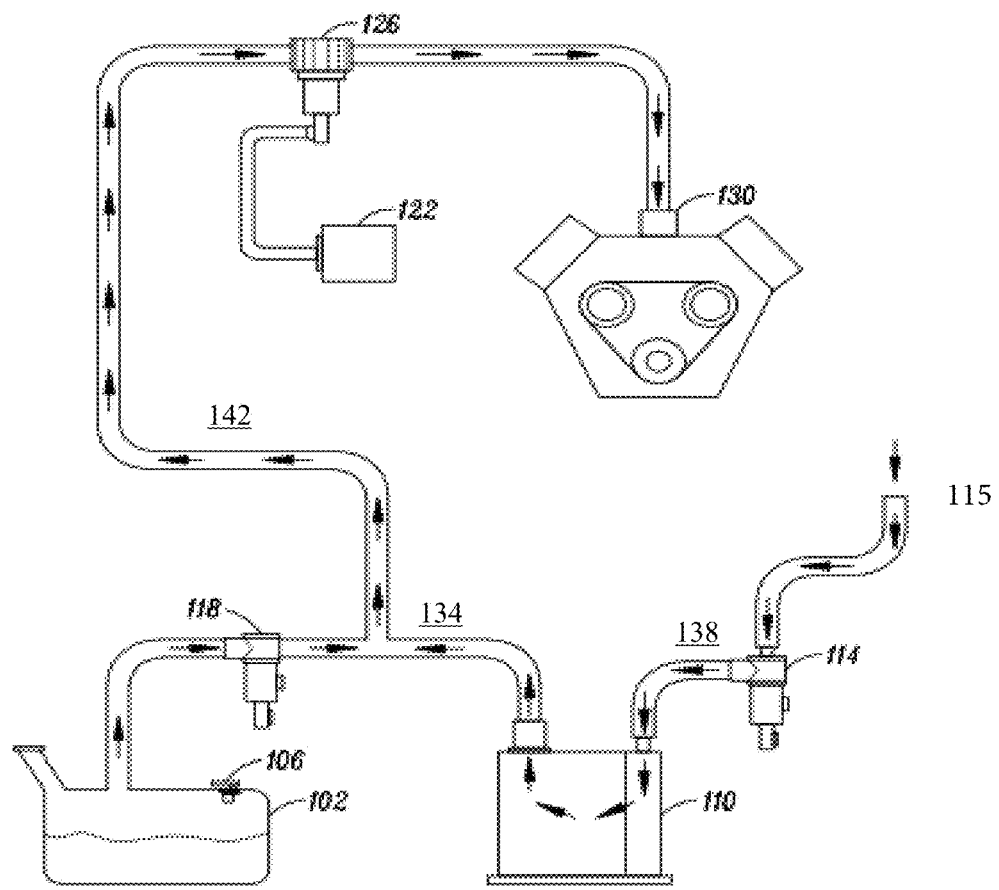
FIG. 1 is a schematic view of a conventional Evaporative Emission Control System configured to reduce vehicle evaporative emissions.

FIG. 1 illustrates a conventional evaporative emissions control system 100. The system is made up primarily of the fuel tank 102, a carbon canister 110, and the engine intake manifold 130, all joined by lines and valves.105. It will be understood that many variations on this design are possible, but the illustrated embodiment follows the general practice of the art. It will be further understood that the system 100 is generally sealed, with no open vent to atmosphere during operation.

Fuel tank 102 is partially filled with liquid fuel 105, but a portion of the liquid evaporates rapidly, producing fuel vapor 107 in the upper portion (vapor dome 103) of the tank. The amount of vapor produced will depend upon a number of environmental variables, such as the ambient temperature, pressure, etc. Of these factors, temperature is probably the most important, particularly given the temperature variation produced in the typical diurnal temperature cycle. For vehicles in a warm climate, particularly a hot, sunny climate, the heat produced by leaving a vehicle standing in direct sunlight can produce very high pressure within the vapor dome of the tank. A fuel tank pressure transducer (FTPT) 106 monitors the pressure in the fuel tank vapor dome.

Vapor lines 124 join the various components of the system. One portion of that line, line 124a runs from the fuel tank 102 to carbon canister 110. A normally-closed fuel tank isolation valve (FTIV) 118 regulates the flow of vapor from fuel tank 102 to the carbon canister 110, so that vapor generated by evaporating fuel can be adsorbed by the carbon pellets under control of the PCM. Vapor line 124b joins line 124a in a T intersection beyond valve 118, connecting that line with a normally closed canister purge valve (CPV) 126. Line 124c continues from CPV 126 to the engine intake manifold 130. CPV 126 is controlled by the powertrain control module (PCM) 122, which also controls FTIV 118.

Canister 110 is connected to ambient atmosphere at vent 115, through a normally closed valve 114. Vapor line 124d connects that 115 in canister 110. Valve 114 is controlled by PCM 118.

During normal operation, valves 118, 126, and 114 are closed. When pressure within vapor dome 103 rises sufficiently, under the influence, for example, of increased ambient temperature, the PCM opens valve 118, allowing vapor to flow to the canister, where carbon pellets adsorb fuel vapor.

To purge the canister 110, valve 118 is closed, and valves 126 and 114 are opened. It should be understood that this operation is only performed when the engine is running, which produces a vacuum at intake manifold 130. That vacuum causes an airflow from atmosphere through vent 115, canister 110, and CPV 126, and then onward into intake manifold 130. As the airflow passes through canister 110, it entrains fuel vapor from the carbon pellets. The fuel vapor mixture then proceeds to the engine, where it is mixed with the primary fuel/air flow to the engine for combustion.

Figure 2:
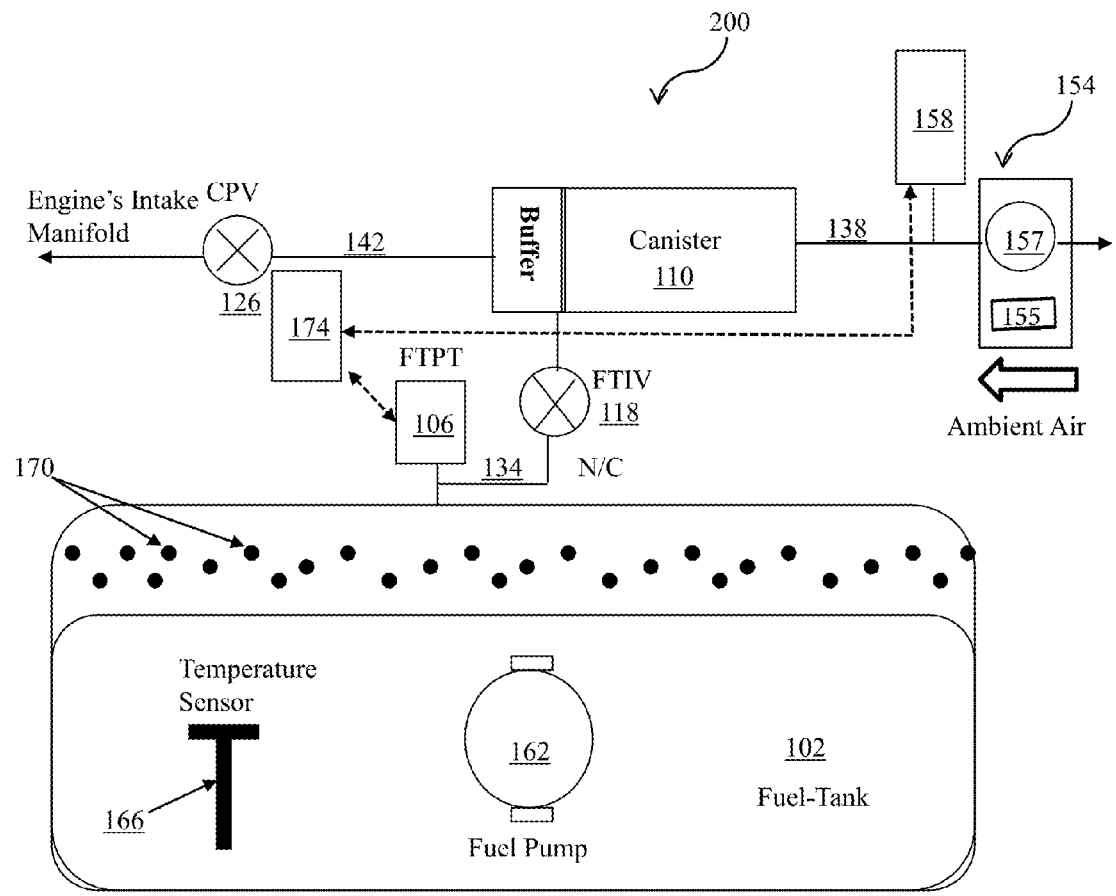
FIG. 2 is a schematic view of an exemplary Evaporative Emission Control system configured to ensure reliable operation of a fuel tank pressure transducer coupled to the fuel tank, according to an embodiment of the present disclosure.

FIG. 2 is a schematic view of an Evaporative Emission Control System 200 of the present disclosure. This embodiment differs from the conventional system of FIG. 1 as follows.

First, a temperature sensor 166 is positioned within fuel tank 102, to measure its interior temperature. Though only one temperature sensor 166 is shown, multiple sensors may be employed. An average of the temperature values detected by those sensors can be taken to obtain a more precise measure of the temperature within the interior of the fuel tank 102. All such temperature sensors are operatively connected a controller 174, which item is discussed in detail below.

An Evaporative Leakage Check Module 154 is positioned adjacent to the second pressure sensor 158. The ELCM includes three components, a pump 157, and ELCM pressure sensor (ELCMPS) 158 and a changeover valve (COV) 155. Pump 157 can be a vacuum pump of the type commonly employed by the art to evacuate evaporative emission control systems.

Figure 3A:
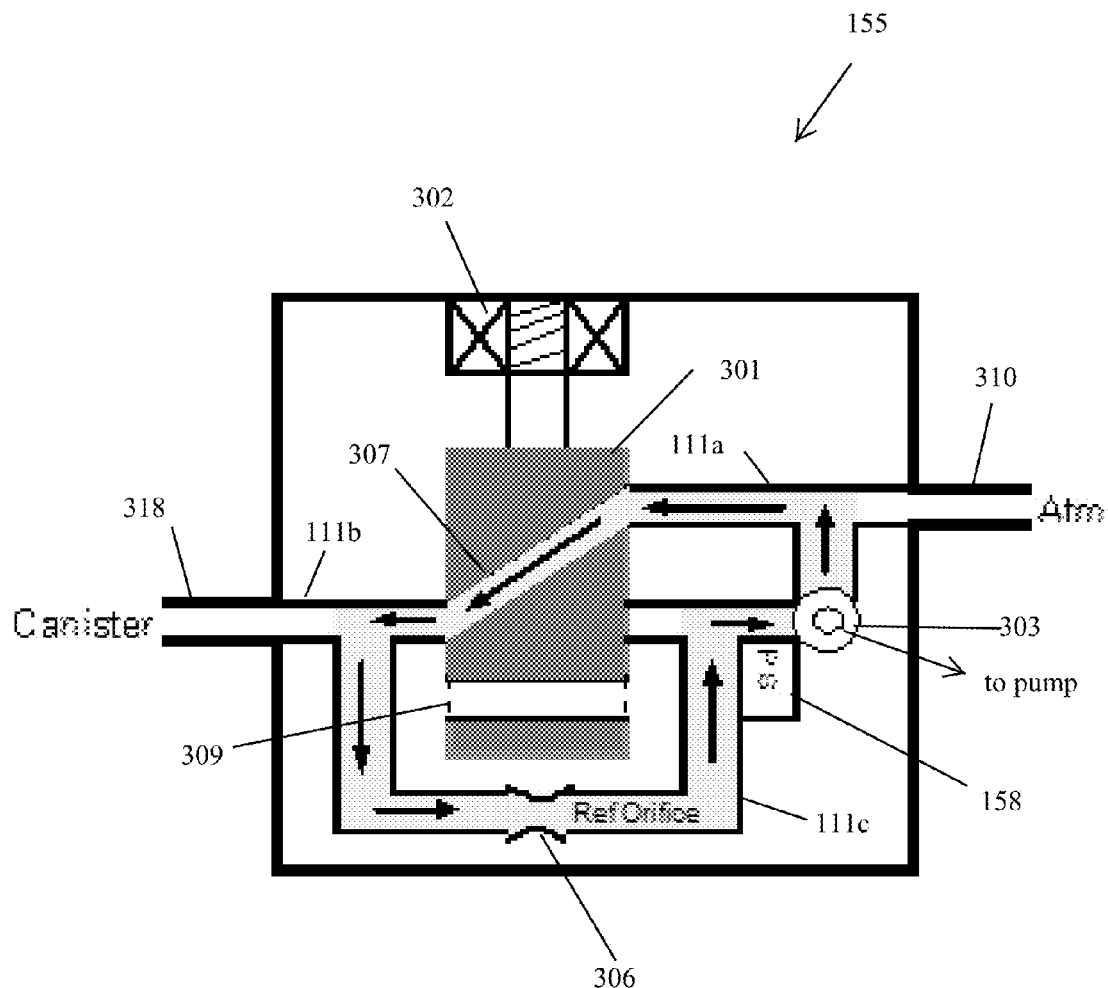
FIGS. 3A and 3B illustrate the flow through an energized Change over Valve (COV), being an integral component of the system of FIG. 1.
Figure 3B:
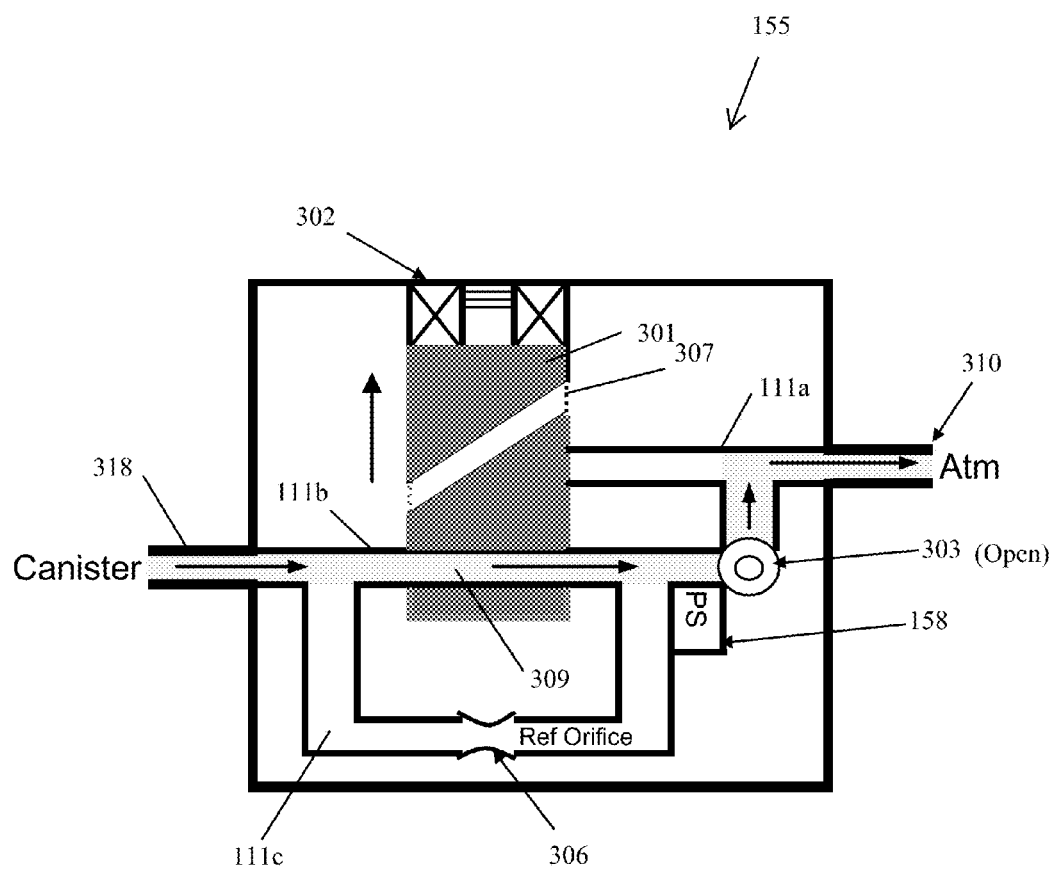

FIGS. 3A and 3B schematically illustrate COV 155. This device includes two input/output connections. The first of those connects to fluid communication line 318, which runs to canister 110. A second connection provides a vent to atmosphere through system vent 310. Within the device, three possible airflow paths are provided, as selected by a solenoid 302. That device has a solenoid body 301, a solid, generally cylindrical body having two flow paths formed through it: a vertically oblique path 307 and a horizontal path 309. Solenoid 302 moves between a de-energized position, illustrated in FIG. 3A, in which solenoid body 301 extension maximum extent downward into ELCM 155, and an energized position, seen in FIG. 3B. In the latter position, solenoid body 301 is drawn upward toward the windings of solenoid 302.

Of the flow paths within ELCM 155, airflow path 111a extends from a position adjacent solenoid 302 to system vent 310. This airflow path is positioned in alignment with one outlet of oblique flow path 307 when solenoid 302 is not energized.

Airflow path 111b runs from the junction with fluid communication line 318, to a junction with airflow path 111a. This flow path is interrupted by solenoid 302, and the ends thus formed in flow path 111b are positioned in alignment with horizontal path 309 when solenoid 302 is energized. Additionally, a three-way valve 303 is positioned in flow path 111b between solenoid 302 and the junction with path 111a. Valve 303 can be open, closed, or placed in fluid flow with pump 157.

Airflow path 111c has a general U-shape, straddling solenoid body 301, with both ends opening onto airflow path 111b on both sides of solenoid body 301. A restriction 306, having an orifice size which can be selected to accommodate various regulatory requirements, such as 0.020 inches, is inserted into flow path 111c. Pressure sensor 158 reads pressure at a point between the junction of airflow path 111c and valve 303.

In the de-energized state shown in FIG. 3A, oblique path 307 joins flow path 111a and 111b. In a situation in which CPV 122 is closed, operation of pump 157, together with the positioning of valve 303 to connect pump 157 to flow path 111b, routes the airflow through restriction 306. This low flow rate provides an artificially low baseline for pressure sensor 158, allowing that instrument to more readily sense variations in pressure.

The energized state of solenoid 302, shown in FIG. 3B, pulls solenoid body 301 upward, so that horizontal path 309 completes the straight-through channel of path 111b. When valve 303 is open, airflow path 111b provides a ready flow path to atmosphere.

Figure 4:
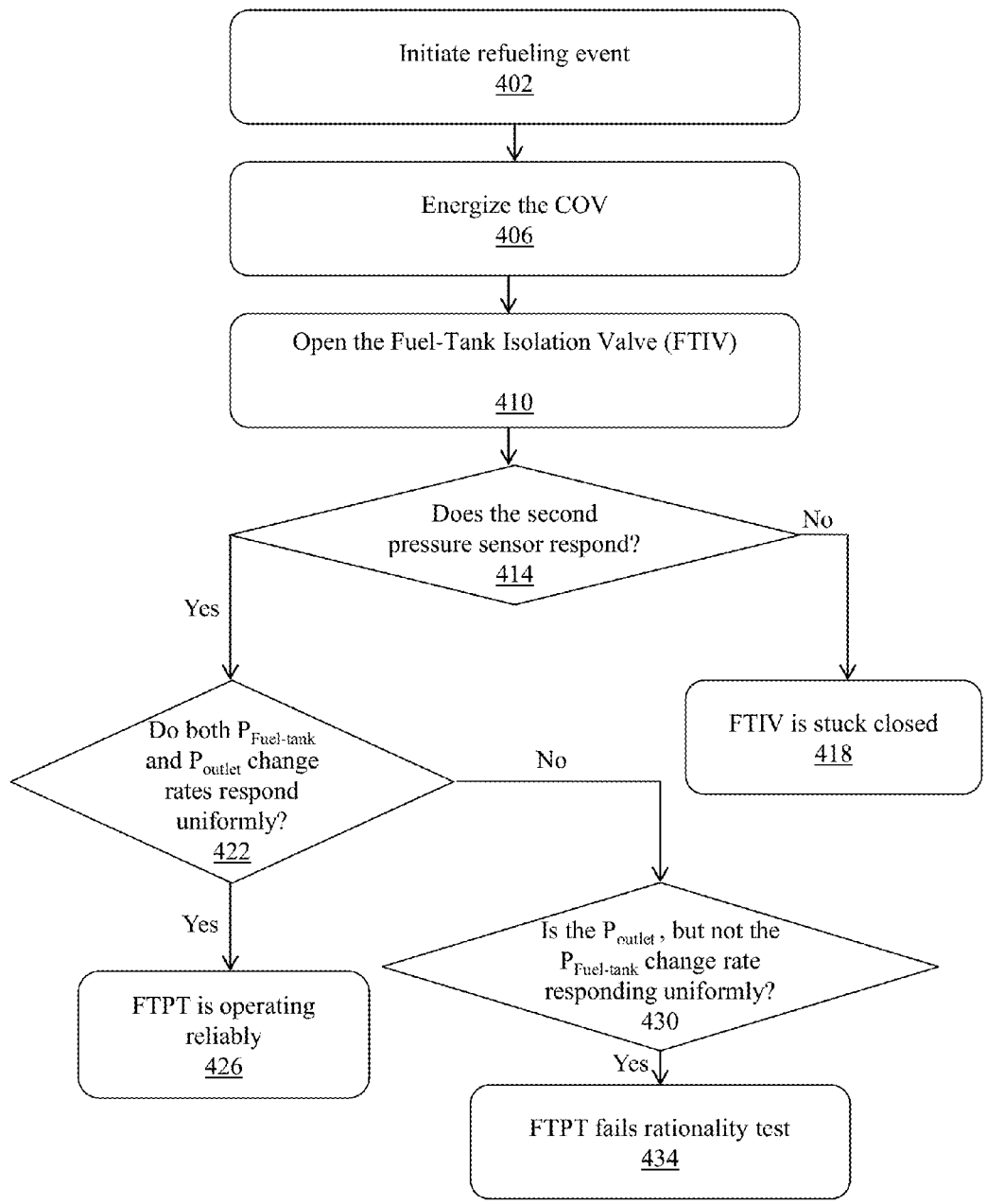
FIG. 4 is a flowchart setting out an exemplary method for ensuring reliable operation of a fuel tank pressure transducer coupled to a fuel tank of a vehicle, in accordance with the present disclosure.

Operation of the rationality test of the present disclosure will be described in conjunction with the apparatus illustrated in FIGS. 2, 3A, and 3B, together with the flowchart of FIG. 4. This test is performed to ensure that the system is operating properly before opening the fuel tank refill cap. If, for example, that cap is opened when the fuel tank is under pressure, fuel can be forced out of the tank, possibly striking the person filling the tank, and at the very least discharging volumes of hydrocarbons into the atmosphere. If conditions are such that a partial vacuum exists in the fuel tank, the cap will be difficult or impossible to open. Therefore, test 200 is run between the time the driver initiates a refueling cycle and the time when the fuel tank cap is removed.

At step 402, the driver initiates a refueling cycle. Although conventional automobiles do not require initiating refueling, PHEV's have made provision for this step, precisely for the reasons set out above. Thus, PHEV's make require the driver to initiate a refueling cycle, typically with a device such as a button located on the dashboard. As those in the art will understand, a wide variety of means are available for performing this step, including voice-activated devices.

At this point, solenoid 302 is in the non-energized state shown in FIG. 3A. Airflow runs through the orifice 306, which has the effect of sensitizing pressure sensor 158, as discussed above.

Then, the system energizes COV 155, at step 406, pulling solenoid body 301 to the position shown in FIG. 3B. This action provides an open exit path from the canister 110 through vent 310 to atmosphere. Then, at step 410, the FTIV 118 is opened, creating a flow path from the fuel tank 102, through FTIV 118, through canister 110, through ELCM 154 and out through vent 310 to atmosphere. During this process, controller 174 monitors the state of the various components such as FTIV 118, and it also monitors the pressure signals from FTPT 106 and ELCMPS 158.

Figure 5:
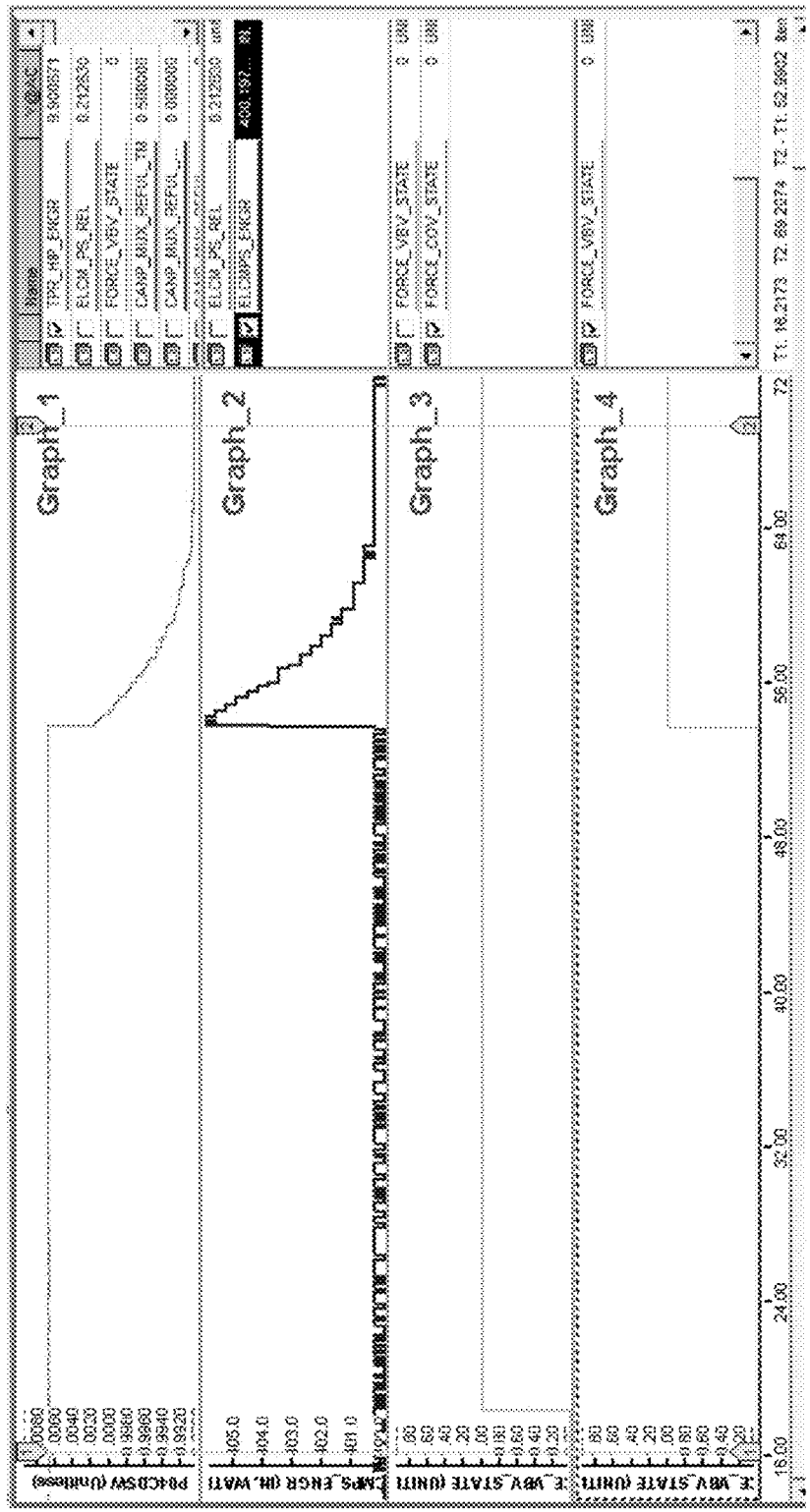
FIG. 5 is a timing diagram, depicting operational signals associated with components of an embodiment of the present disclosure

Further illustration of the system operation, coupled with improved visualization of the signal states over time, can be seen in FIG. 5, a screenshot showing the timing diagram of events within various parts of the system. There, four events are followed in Graphs_1-4. Graph_1 and Graph_2 show the pressure signals of the FTPT and ELCMPS, respectively. Graph_3 and Graph_4 show the activation states, respectively, of the COV 155 and FTIV 118.

Following time from left to right, the timing diagram begins with FTIV 118 closed and COV 155 de-energized; ELCMPS 158 registers a very low pressure, while FTPT 106 registers a high pressure. Almost immediately, COV 155 is activated, moving from the state shown in FIG. 3A to that of FIG. 3B. Then, FTIV 118 is activated, opening the valve as reflected in Graph_4. Immediately, ELCMPS 158 registers a pressure spike, as the high pressure in the fuel tank is experienced at the ELCMPS 158. That high pressure falls off quickly, because the system is now open to atmosphere through vent 310. As reflected in Graph_1, pressure within the fuel tank 102 undergoes a step reduction with FTIV 118 is first opened, followed by a more gradual fall off down to atmospheric pressure. Similarly, ELCMPS 158 undergoes a steady bleed-off, until it also reaches atmospheric pressure. The slope of the pressure decrease at the ELCMPS is slightly steeper than that experienced and the FTPT, owing to the constriction effect of the canister. Still, inspection reveals that the slopes are very similar, and both instruments reach atmospheric pressure at practically the same time.

If the pressure change within the fuel tank does not respond uniformly, then one can infer that the FTPT 106 is not operating reliably, and thus it fails the rationality test.

In a case where ELCMPS 158 responds, then the method starts monitoring the pressures within the fuel tank 102 and at the fuel-system outlet vent, and the rates of change of those pressure values. At step 422, the method checks whether the rates of change of pressure within the fuel tank 102, i.e., $$\left(\frac{d}{dt}[P_{Fuel-Tank}]\right),$$

and the pressure at the outlet vent $$\left(\frac{d}{dt}[P_{Fuel-Tank}]\right)$$

are uniform. If yes, then step 426 concludes that the Fuel tank pressure transducer operates reliably. If not, then at step 430, the method checks for the case if the rate of change of the pressure at the outlet vent, i.e., $$\frac{d}{dt}[P_{Outlet}],$$

is responding uniformly, but is not $$\frac{d}{dt}[P_{Fuel-Tank}].$$

If that is true, then the step 434 concludes that the Fuel tank Pressure Transducer has failed the rationality test, and thus, is not operating reliably.

The method and the system of the present disclosure is highly effective in ensuring reliable operation of the Fuel tank pressure transducers coupled to the fuel tanks in PHEVs, and easily overcomes problems faced by conventional rationality tests for such vehicles, which rely on venting the fuel tank.

Although the current invention has been described comprehensively, in considerable details to cover the possible aspects and embodiments, those skilled in the art would recognize that other versions of the invention are also possible.

What is claimed is:

1. A method for verifying the reliable operation of a fuel tank pressure transducer positioned within a fuel tank of a PHEV, comprising:

detecting the initiation of a refueling cycle;
  opening a system vent valve positioned between a carbon canister and a system vent;
  opening a fuel tank isolation valve to depressurize the fuel system;
  monitoring fuel system pressure within the fuel tank and at the vent valve, the monitoring being performed by a controller;
  determining the rates of change of the fuel system pressure within the fuel tank and at the outlet vent;
  indicating reliable operation of the fuel tank pressure transducer upon a determination that fuel system pressure at the outlet vent rises to the level of fuel system pressure indicated in the fuel tank, and that the rates of change of the fuel system pressure in the fuel tank and at the outlet vent are uniform within a predetermined range.

2. The method of claim 1, further comprising, concluding that the fuel tank isolation valve is stuck closed where the fuel system pressure at the outlet vent does not change with time.

3. The method of claim 1, further comprising, providing a pressure sensor in the vicinity of the fuel system outlet vent, to monitor the fuel system pressure at the outlet vent.

4. The method of claim 1, further comprising, indicating unreliable operation of the fuel tank pressure transducer if the rate of change of fuel system pressure within the fuel tank does not synchronize with, and differs substantially from, the rate of change of the fuel system pressure at the outlet vent.

5. The method of claim 1, being implemented within an Evaporative Emission Control System (EVAP) of the vehicle, wherein the fuel tank isolation valve is disposed in a communication line between the fuel tank and the carbon canister.

6. The method of claim 1, wherein the vehicle is a plug-in hybrid electric vehicle, having a sealed fuel tank.

7. The method of claim 1, wherein unreliable operation of the pressure transducer at the system outlet vent is indicated by a failure to register an increase in pressure following opening the fuel tank isolation valve.

* * * * *